United States Patent

[11] 3,600,954

| [72] | Inventor | Walter W. H. Clarke<br>Eversley, England |
|---|---|---|
| [21] | Appl. No. | 796,879 |
| [22] | Filed | Feb. 5, 1969 |
| [45] | Patented | Aug. 24, 1971 |
| [73] | Assignee | C. B. Associates Limited<br>London, England |

[54] APPARATUS INCORPORATING MAGNETIC RESTRAINT MEANS
6 Claims, 3 Drawing Figs.

[52] U.S. Cl. ............................................. 73/517 R
[51] Int. Cl. ............................................. G01p 15/08
[50] Field of Search .................................. 73/516,
517; 177/201, 212

[56] References Cited
UNITED STATES PATENTS
2,357,891  9/1944  Granberry ................. 177/264

| 2,552,721 | 5/1951 | King ......................... | 331/65 |
| 2,886,302 | 5/1959 | Coffman, Jr. et al. ........ | 177/185 |
| 3,074,279 | 1/1963 | Morris ....................... | 73/517 |

Primary Examiner—Richard C. Queisser
Assistant Examiner—Herbert Goldstein
Attorney—Woodhams, Blanchard and Flynn ABSTRACT: An apparatus having a movable mass which is displaced upon the application of an external influence. The extent of the displacement is indicative of the magnitude of the external influence. Magnets are provided to restrain the movement of the mass, the position of the magnets relative to the mass being adjustable whereby to vary the response of the apparatus to the external influence. The apparatus is particularly suited as an accelerometer.

INVENTOR
WALTER W. H. CLARKE
BY Woodhams, Blanchard & Flynn
ATTORNEYS

APPARATUS INCORPORATING MAGNETIC RESTRAINT MEANS The present invention relates to an apparatus having a movable mass the movement of which is restrained or damped by means of magnets. Such an apparatus can be utilized as an accelerometer.

According to one feature of the present invention an apparatus for determining the magnitude of an external influence comprises a pivotable member, a stationary assembly having a pair of coaxial members disposed one adjacent each end of and spaced from the pivotable member, at least one of said pivotable members and stationary assembly comprising magnet means, and means for adjusting the spacing between the pivotable member and said stationary assembly.

Where one of the pivotable members and stationary assembly comprises a magnet means, the other is a ferromagnetic material, which term includes suitable ferrite and ceramic materials of high permeability. The term magnet means includes both permanent magnets and electromagnets.

According to another feature of the present invention an apparatus for determining the magnitude of an external influence comprises a first pivotable magnet means, a central transverse pivot for the magnet means, a pair of coaxial stationary magnets disposed one adjacent each end of and spaced from the first magnet means, the axis of the pair of magnets being offset with respect to the pivot axis of the first magnet means, the first magnet means and the pair of stationary magnets being arranged with adjacent ends of opposite polarity, and means for adjusting the spacing between the first magnet means and each of the pair of coaxial stationary magnets.

The invention will be described further, by way of example, with reference to the accompanying drawings, in which.

Figure 1:
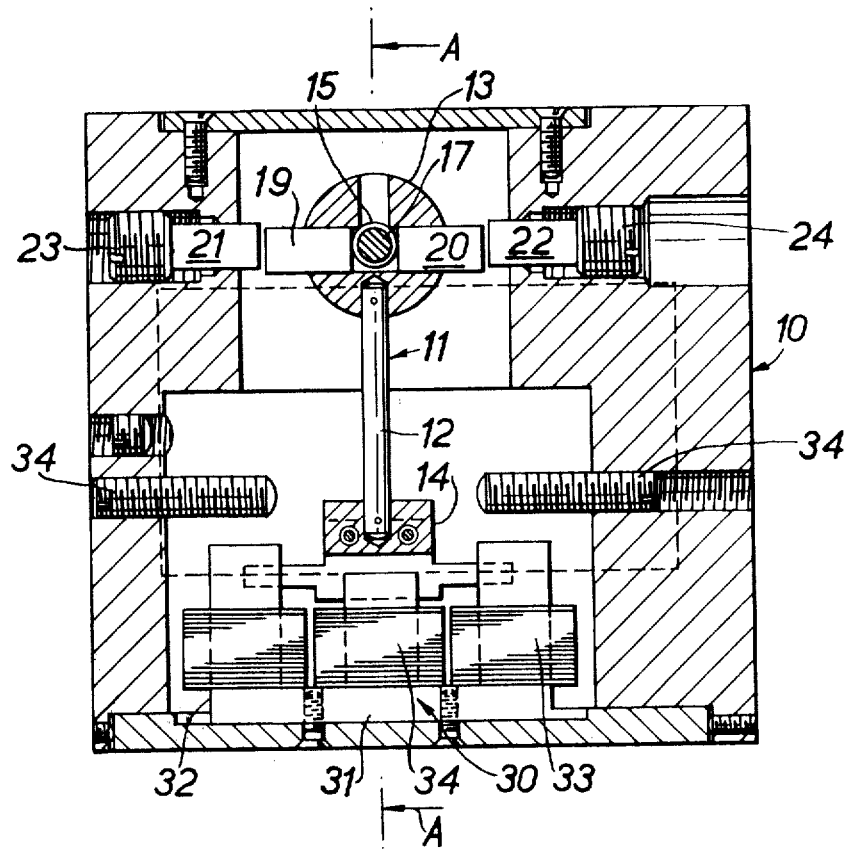
FIG. 1 is a cross section through an accelerometer and taken on line B—B in FIG. 2.
Figure 2:
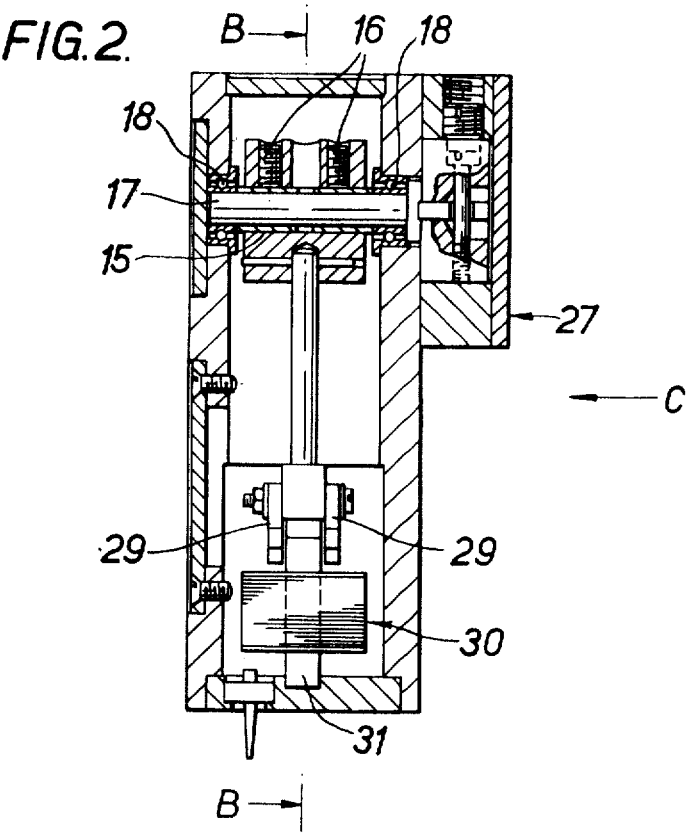
FIG. 2 is a section along line A—A in FIG. 1.
Figure 3:
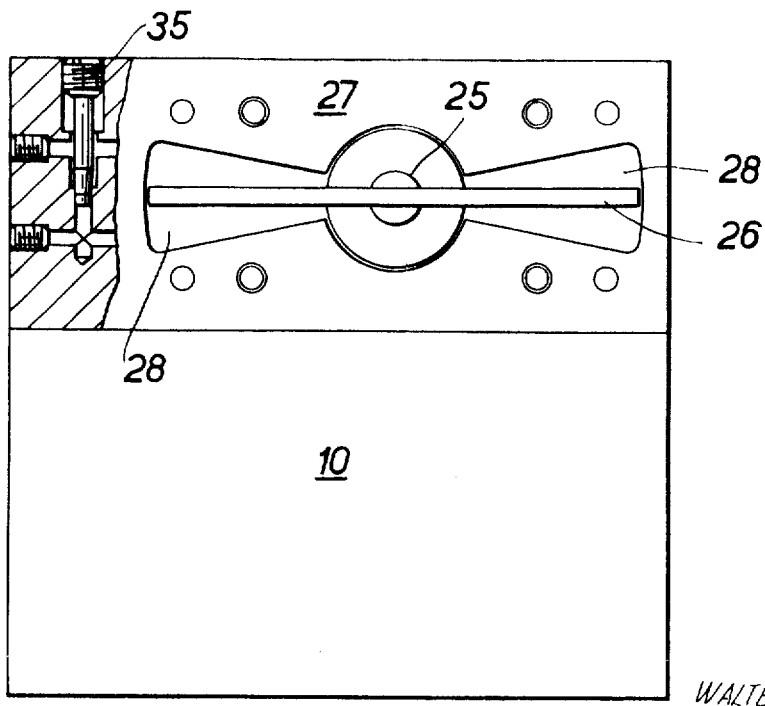
FIG. 3 is an end view of the accelerometer in the direction of arrow C in FIG. 2.

A housing 10 supports a pendulum assembly 11 comprising a pendulum shaft 12 having a cylindrical pendulum boss 13 at its upper end and a mounting block 14 at its lower end. The boss 13 is secured to a central sleeve or sleeves 15 by screws 16. The sleeve or sleeves are mounted upon a spindle 17 which is journaled in bearings 18 in opposite walls of the housing.

As shown in FIG. 1, the boss 13 carries a pair of coaxial magnets 19, 20. The housing 10 carries coaxial magnets 21, 22 disposed one at each side of the boss 13. The axis of the magnets 19, 20 is disposed below the axis of the magnets 21, 22. The magnets 21, 22 are movable axially away from and towards the magnets 19, 20 whereby to adjust the gaps between the magnets by means of screw adjustment members 23 and 24 respectively.

An extension 25 of the spindle 17 passes through a wall of the housing 10 and carries an air damper vane 26. The vane is located within a damper housing 27 secured to the housing 10 and the vane is movable in accurately dimensioned sections 28 in this housing. The clearances between vane and housing may be chosen to give a desired degree of damping.

The mounting block 14 and the lower end of the pendulum shaft 12 carries pole pieces 29, one at each side thereof, which cooperate with a coil assembly 30 mounted upon a plate at the bottom of the housing. The coil assembly comprises a care 31 having three upstanding legs each surrounded by its associated coil. The two outer coils 32, 33 are connected in series opposition between output terminals. The center coil 34 is an AC input coil.

A displacement of the pendulum and thus of the two pole pieces at the lower end thereof changes the cross section of the gap between the pole pieces and the former thus modifying the voltage induced in each output coil according to the direction and extent of swing of the pendulum.

The resultant output is the difference between the voltage induced in each of the output coils. When the pendulum is balanced the output is zero. When the pendulum is out of balance the output of one coil increases and that of the other decreases.

The above coil assembly is an example of one convenient arrangement for evaluating pendulum displacement. It is envisaged that a differential capacitor could be employed for this purpose.

The magnets 21, 22 cooperate with the magnets 19, 20 in the pendulum boss to restrain the pendulum from movement in the absence of a displacing force. The spacing or gap between the magnets 19, 20 and 21 are so adjusted that pendulum will be displaced when an accelerating force is sufficient to overcome the magnetic force and such displacement will be proportional to the magnitude of the force. An adjustment of the spacing between the magnets 19 and 21 and the magnets 20 and 22 will determine the magnitude of the attractive force between the magnets and the rate at which the accelerometer responds to the external force. An adjustment of one only of the magnets 21 and 22 will cause the pendulum to pivot about its spindle 17 and this can be used to calibrate the instrument to a desired setting before operation. This is possible as the magnets are out of line.

The air damper vane prevents excessive oscillation of the pendulum in use. Stops 34 are provided to limit the swing of the pendulum. Fine adjustment of damping is obtained by a controlled leak path 35.

The magnets are disposed with the north pole of one magnet facing the south pole of a neighboring magnet.

In operation the pendulum will swing from its set position of balance upon the application of an accelerating force. The extent of swing as measured by the output of the coils will be a measure of the accelerating force.

I claim:

1. An accelerometer for determining the magnitude of an external influence, comprising:
    a housing;
    a pendulum assembly mounted on the housing and including a pendulum shaft suspended for movement relative thereto about a pivot axis and responsive to an accelerated movement of the housing;
    means responsive to the pivotal movement of the pendulum shaft to indicate the magnitude of the external influence to which the accelerometer is subject;
    first magnet means comprising two aligned rectilinear members mounted on the housing on an axis extending transversely of the pendulum shaft and perpendicular to the pivot axis;
    second magnet means mounted on the pendulum shaft between the aligned members of the first magnet means, the first and second magnet means being disposed on spaced parallel axes and the two members of the first magnet means and the second magnet means having adjacent ends of opposite polarity; and
    Means for adjusting the spacing between the aligned members of the first magnet means and the second magnet means to cause the movement of the pendulum shaft, when the accelerometer is subjected to an external influence, to be proportional to the magnitude of the external influence.

2. An accelerometer according to claim 1, in which the means responsive to the pivotal movement of the pendulum shaft, to indicate the magnitude of the external influence, comprise a differential transformer operable as a displacement transducer responsive to movement of the pendulum assembly relative to the housing.

3. An accelerometer according to claim 1, in which the second magnet means comprise two aligned rectilinear members.

4. An accelerometer according to claim 1, in which one of the spaced parallel axes passes through the point of intersection of the pivot axis and the axis of the pendulum shaft.

5. An accelerometer according to claim 1, in which the pendulum assembly includes a boss and a mounting block at opposite ends of the pendulum shaft; the mounting block carries differential transformer pole pieces; and the housing includes a support spindle rotatably supporting the boss, and a coil assembly cooperable with the pole pieces.

6. An accelerometer according to claim 5, including a spindle extension protruding beyond the housing, and an air damper vane mounted upon the extension, and means for controlling the degree of damping.